United States Patent Office 3,000,281
Patented Sept. 19, 1961

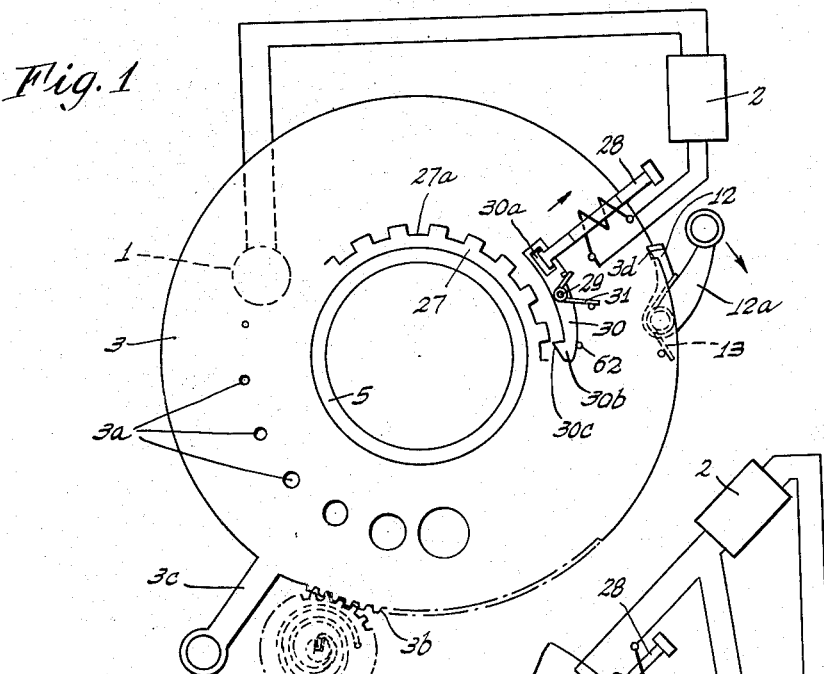
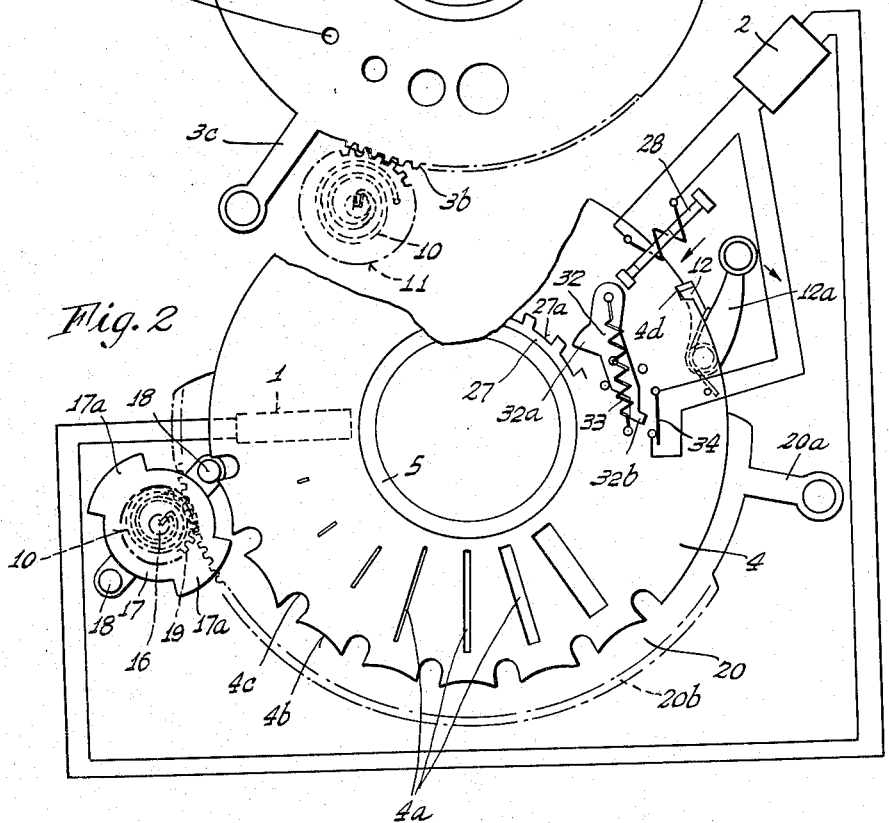

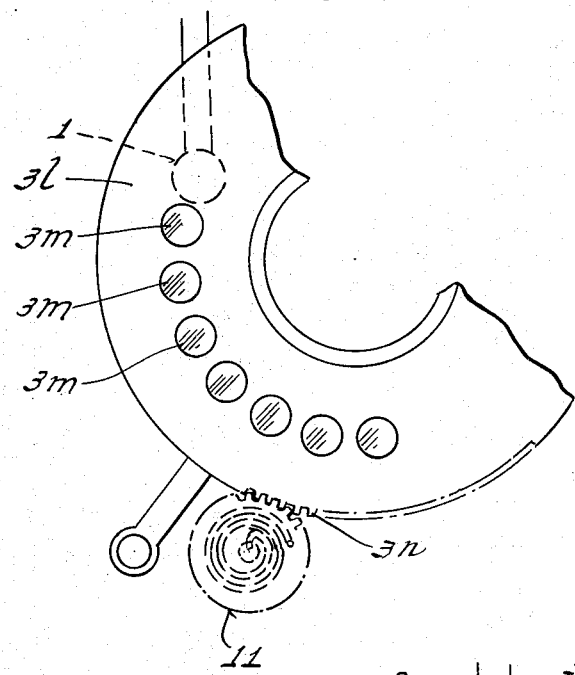
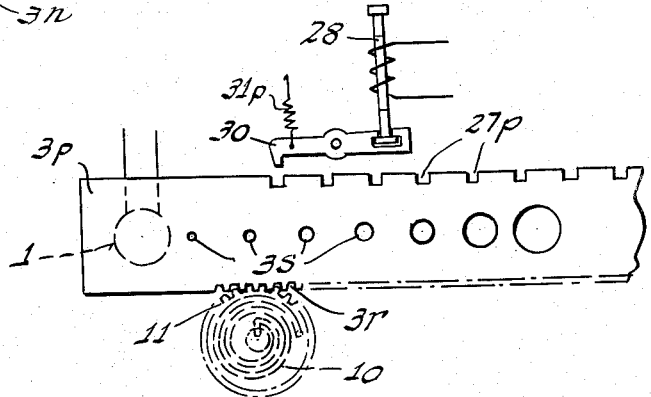
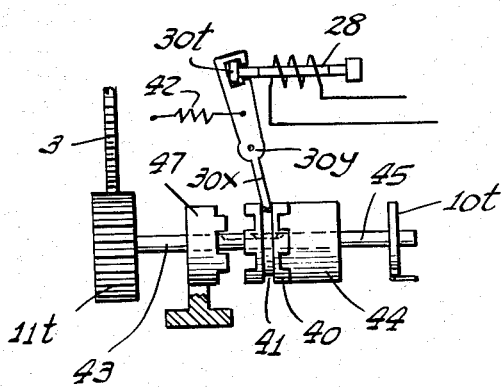

3,000,281
PHOTOGRAPHIC CAMERA HAVING AUTOMATIC EXPOSURE SETTING
Waldemar T. Rentschler, Calmbach (Enz), Germany, assignor to Alfred Gauthier G.m.b.H., Calmbach (Enz), Germany, a corporation of Germany
Filed Aug. 30, 1957, Ser. No. 681,305
Claims priority, application Germany Sept. 26, 1956
17 Claims. (Cl. 95—10)

This invention relates to photographic cameras, and more particularly to means for obtaining correct exposure settings of the various adjustment members in a camera.

The invention is concerned with improvements in the automatic shutter structure of my copending basic German application Number G19 327 IX/57a filed in Germany on the 31st day of March, 1956. The present application corresponds to German patent application Number G20 632 IX/57a entitled "Photographic Camera or Photographic Shutter Respectively With Automatic Speed Setting," filed on September 26, 1956, priority being claimed under this corresponding German application.

In my basic German application above referred to there is described and claimed a camera and shutter structure wherein, for the purpose of obtaining an automatic speed setting, a photoelectric cell is utilized, feeding into an electronic amplifier which in turn is adapted to actuate an electro-responsive motive means. The organization is such that upon sufficient light being directed against the photocell, the motive means will be made to operate. In this parent application an exposure setting member such as an exposure value-diaphragm or speed-setting member is provided with means for varying the light which strikes the photocell, and a lock is arranged in such a manner that the movement of such setting member will be halted when the amount of light striking the cell attains the value needed to actuate the motive means. In consequence, the light intensity is thus utilized to effect the proper positioning of the setting member, through the medium of the photocell, amplifier, motive means and lock actuated thereby.

With this organization of my basic patent there is thus provided an automatic exposure setting device having great reliability and accuracy, which device is not subject to the disadvantages inherent in other types of devices for accomplishing an automatic exposure setting, involving for example a galvanometer movement, sensing elements responsive to the positions of the movable member of the galvanometer, etc.

In my basic patent application the motive means is energized whenever the amount of light striking the photocell reaches a sufficient value, and in consequence of this the exposure-setting member is immediately locked in the position which it occupied at that time. Such position might be in between designated values of speed, diaphragm opening, exposure value, etc., and thus the locked positions would represent undefined intermediate values which could then be unfavorable with respect to the camera function. Such undefined intermediate values would occur, for instance, if the speed-setting member were properly operative only for designated or selected settings, or if the diaphragm is not constantly adjustable, as when there is utilized a so-called hole diaphragm instead of an iris diaphragm.

The above disadvantage found in my parent application is obviated by the present invention, and one object of the invention is to provide a novel and improved photographic camera and shutter structure utilizing a locking means for halting the setting member in response to the attainment of a predetermined value of light energy, characterized by the locking being effective only in the designated or predetermined adjustment positions of the setting member.

In accomplishing this, the invention provides for the changing of the illumination which is permitted to strike the photocell, by distinct steps, such steps being coordinated with the designated setting positions of the exposure-setting member. The lock is made operative when the proper stepped value of light is obtained, thus locking the setting member in one of its designated positions.

Details of several embodiments of the invention by which this concept is carried out, are given below, and other features and advantages will hereinafter appear.

In the accompanying drawings, similar characters of reference indicate corresponding parts wherever possible in the several views, in which:

FIGURE 1 is a schematic representation of an automatic exposure setting means as provided by the invention.

FIG. 2 is a schematic representation of an automatic exposure setting means illustrating a modification of the invention.

FIG. 5 is a fragmentary elevational view of a different type of cover member which is substitutable for the cover member having different-sized apertures as shown in FIG. 1.

FIG. 6 is a fragmentary elevational view of yet another type of cover member in the form of a slide arranged to have linear movement, such slide being an alternative arrangement with respect to the rotary cover members of FIGS. 1 and 2.

FIG. 7 is a schematic representation of an automatically controlled magnetic clutch, adapted for use in controlling the rotary member shown in FIGS. 1 and 5.

Figure 3:
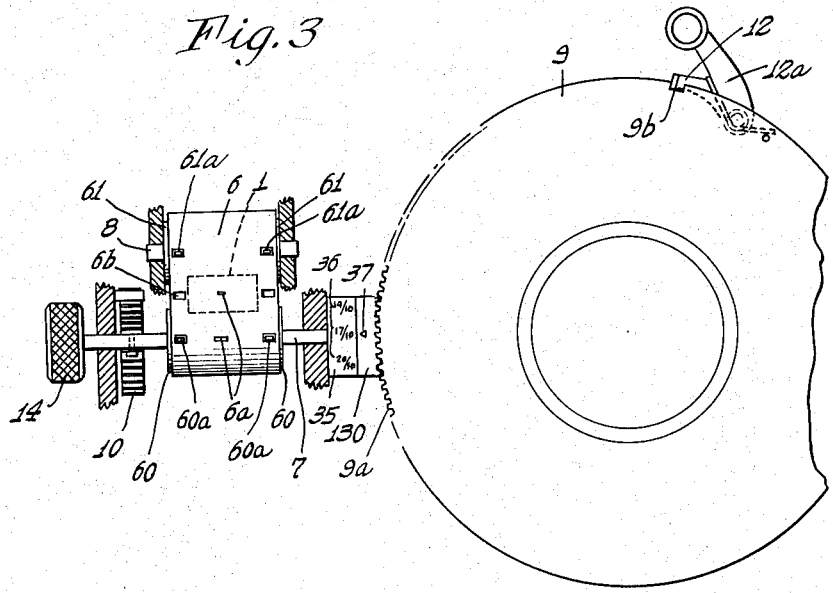
FIG. 3 is a diagrammatic or schematic representation of an exposure setting means representing yet another embodiment of the invention.

Referring first to FIGS. 1–3 there is shown a known type of photocell or photo element, indicated by the numeral 1. As in my basic patent above referred to, the photocell 1 is suitably connected so as to feed into an electronic amplifier 2, which may be advantageously of the miniature type employing transistors, and the amplifier 2 is utilized to energize an electro-responsive motive means such as an electric solenoid.

The organization is such that when light energy in excess of a certain value is directed against the photocell, it will cause energization and operation of the electromagnet. This movement is then utilized to operate a lock, which is so arranged as to prevent further movement of the exposure-setting member, thus holding the setting member in the position found proper for the exposure as determined by the photocell.

In accordance with the present invention, a stepped control of the light energy which energizes the photocell is provided, such control being made operative concurrently with the movement of the exposure-setting member. That is, as the exposure setting member attains its various different selected positions, different stepped values of light energy will be brought to bear on the photocell, and when any one value of light energy is sufficient to cause operation of the lock, the setting member will be held in its adjusted position, whereby the proper conditions are met for a correct exposure.

Thus, by the present invention there is made certain that the setting member will be arrested or locked only in the predetermined positions corresponding to designated or preselected diaphragm and shutter speed values. The accomplishment of this flows from the fact that the energy (applied to the solenoid) is not varied in a continuous manner, but instead is varied in steps because of the stepped light values to which the photocell is subjected, and the said steps are coordinated with the selected setting positions of the setting member.

In the embodiment of the invention shown in FIGS. 1–3, the change in the illumination of the photocell is obtained in a simple manner, by the provision of a plate, slide or movable cover member 3, 4, or 6 respectively, which is coupled for movement with the exposure-setting member of the shutter structure. The plate, slide or cover member is provided with openings of different size, arranged at certain intervals, these openings constituting windows adapted to be disposed one after another in front of the photocell, to permit light to pass through the cover member and strike the cell.

In FIG. 1, the cover member 3 is illustrated as having circular apertures 3a of different graduated sizes, whereas in FIG. 2 the cover plate 4 has rectangular slots 4a of different graduated areas.

A limit for the size of the smallest diaphragm apertures 3a or 4a may be arrived at by considering the size of the smallest surface element of the photocell, assuming that the light-sensitive layer is sufficiently homogenous so that it does not inject a factor of error. The apertures 3a and 4a may be advantageously related to each other by a factor of 2. A limit for the size of the largest aperture may be obtained by considering the overall exposed surface of the photocell, or the window space available for the photocell in the camera or shutter structure. From the above considerations it follows that automatic exposure devices of the present type are especially suited to cameras and shutter structures wherein there is provided a lesser number of exposure values, obviating the necessity for extremely large or extremely small apertures 3a and 4a.

Further, to insure the correct operation of the present automatic exposure setting means it is necessary that the apertures or windows in the cover member be so arranged and selected that during the transition period when one window is being replaced by another the amount of light passing through the replacing and the replaced windows will not represent a total illumination which is greater than that to be permitted by the larger window which is replacing the smaller one. With the slot-shaped windows or apertures 4a smaller intervals may be obtained than with the circular apertures 3a, and accordingly the slots 4a are especially advantageous where exposure-setting members are found, having a small travel distance between adjoining predetermined or selected settings.

In the above embodiment of the invention the stepped change in the energization of the solenoid which actuates the lock is effected by the provision of different-sized apertures or windows, permitting different amounts of light to strike the photocell. Other means for obtaining the stepped energization of the solenoid may be employed, for example by changing the output voltage of the photocell in steps, changing the output of the amplifier 2 in steps, etc. Moreover, in place of the cover members having unobstructed windows, cover members may be employed having different degrees of opacity, as by providing transparent portions or portions of different intensities of gray color or the like. Such a gray cover member could be made either in a single piece, or it might be subdivided into a number of parts, for example in such a way that separated diaphragm apertures of the same size are provided, having grayish windows of different degrees of light permeability.

A cover member as above mentioned is illustrated in FIG. 5. In this figure, the cover member 31 is of the rotary type, similar to the rotary member 3 shown in FIG. 1. The cover member 31 has teeth 3n arranged to mesh with a gear 11 which is spring driven, such gear and its spring drive being described in detail at a later point. The cover member 31 has a plurality of separated diaphragm apertures 3m which are of the same size, said apertures having grayish windows of different degrees of light permeability.

An advantage resulting from such an organization employing windows of different permeability is that all the windows may be of such size as to utilize fully all of the light-sensitive surface of the photocell. Any irregularities of such surface would therefor have the least deleterious effect. Also, photocells of relatively small surface area may be employed, requiring but little space in the camera or shutter structure. Additionally, by the use of windows of different permeability material the present automatic setting device may be readily utilized with exposure-setting members having a much greater number of steps or adjustments.

Further, a greater number of steps may be obtained, for coordination with a setting device having a large number of steps, by altering the illumination power and also the illumination surface of the photo electric cell. And either or both such organizations may be utilized, as found to be desirable.

This may be accomplished in a simple manner by not only using windows with different degrees of light permeability, but also by changing the size and shape of the windows.

The window-carrying member or plate may be constituted as a disc or slide, which is connected with the exposure setting member to be actuated in response to movement of the latter. Such organization makes it possible to easily arrange the window or diaphragm apertures, as well as the photocell, to adapt the structure readily to existing cameras and/or shutter structures.

A linearly movable slide 3p, which is an alternative to the rotary cover member 3 shown in FIG. 1, is illustrated in FIG. 6. The slide 3p has gear teeth 3r in the form of a rack, which mesh with the teeth of a rotary gear 11 powered by a spring 10, as will be later described in greater detail. The slide 3p has a plurality of apertures 3s of graduated size, and also has notches 27p disposed in one edge, which are cooperable with a two-armed lever 30 by which movement of the slide 3p may be halted with any one of the apertures 3s in front of the photo cell 1. The two-armed lever 30 is biased clockwise by a spring 31p, and is operable in a counterclockwise direction in response to energization of a solenoid 28 which is connected through a suitable amplifier to the photo cell 1. The action of the driving gear 11 and spring 10, and the action of the notches 27p and two-armed lever 30 together with the solenoid 28 energized by the photoelectric cell 1 are similar to the organization illustrated in FIG. 1, which is described in detail at a later point.

By virtue of a disc being readily centrally supported, it may be advantageously incorporated in lens shutters, whereas a cover member in the form of a slide requires a straight-line motion, which may be especially suitable for incorporation in a camera housing.

As seen in FIGS. 1 and 2, the cover member or carrier is constituted as discs 3 and 4, such discs being carried by bearing shoulders 5 located, for example, at the front lens nozzle of the shutter structure. The discs 3 and 4, in this organization, could be simultaneously constituted as the exposure setting member of the device.

Referring to FIG. 3, the cover member or carrier may be in the form of a roll strip or band adapted to be moved simultaneously with the exposure setting member 9. The band 6 may be provided with diaphragm apertures 6a in the form of slots, and is shown as passing around two rollers 60 and 61 which are carried on spindles 7 and 8 respectively. As will be later described in greater detail, the roll 60 is connected with the exposure setting member 9 for concurrent movement therewith. The band 6 may have perforations 60a for accommodating pins 61a on the rollers 60 and 61, thereby to provide a positive drive for the band.

Instead of the diaphragm apertures 6a, or in addition to the same, the band 6 could carry grayish discs, which could be made of flexible sheet plastic or other similar suitable material.

The organization of the band 6 as set forth in FIG. 3 may be made extremely compact, since the largest space required is only equal to that of the largest diaphragm opening plus the diameter of the two rolls 60 and 61. Between the rollers 60 and 61, there is arranged the photocell, which therefore does not require any additional space.

For the purpose of obtaining quick and easy operation of the present improved setting means, I provide a motor drive, as for example a spring drive which, prior to effecting the automatic adjustment, may be cocked and bolted or latched in its cocked position.

Due to the manner in which the present improved setting means operates, it is important to initiate the start of the setting operation with the smallest light admitting of the apertures of the cover member disposed in front of the photocell. Further, in order to facilitate the operation and simplify the procedure required of the operator, the cocking movement for the spring drive may be effected in response to shifting of the setting member to bring the smallest aperture adjacent the photocell.

In the embodiment of the invention illustrated herein the drive of the exposure setting member (and cover member) is effected by means of a spiral spring 10. To transmit the driving power from said spring to the parts which are to be moved, in FIGS. 1 and 3 there is arranged in a simple manner a gear drive. In FIG. 1, the spring 10 is connected to a gear 11 mounted on a fixed spindle, said gear meshing with teeth 3b provided on the periphery of the disc 3 which has the window or diaphragm aperture 3a. For the purpose of cocking the spring 10, the disc 3 has a manually engageable handle 3c. The latching or bolting of the spring 10 is also effected at the disc 3, by means of a handle 12a provided with a latch arm 12 which under the action of a spring 13 locks in to a notch 3d provided in the periphery of the disc.

Referring to FIG. 3, a spring 10 is provided on the spindle 7, having its outer extremity fixed and its inner end secured to the spindle. The exposure setting member 9 has teeth 9a on its periphery, meshing with a gear 130 carried by the spindle 7. For cocking the spring 10, the spindle 7 is provided with a knob 14, and the spring is locked in its cocked position by the latch 12, 12a together with the notch 9b provided in the periphery of the setting member 9.

Figure 4:
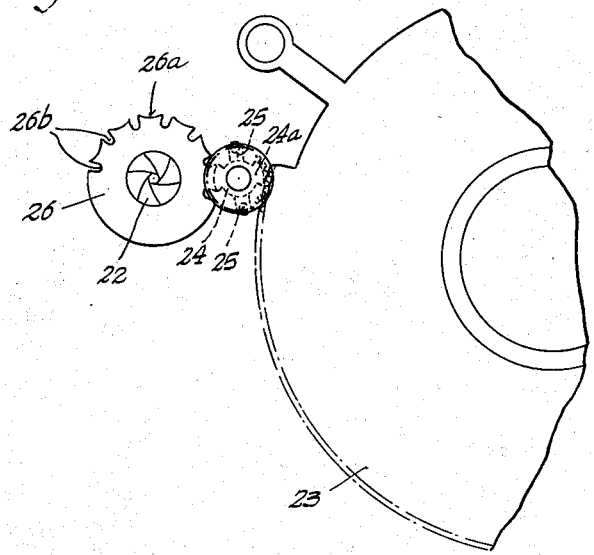
FIG. 4 is a view like FIGS. 1, 2 and 3, illustrating still another embodiment of the invention.

In the embodiments of the invention shown in FIGS. 2 and 4 the transmission of power from the spring 10 is effected by a stepped-drive device such as a Geneva drive. Such a power transmission provides a high degree of reliability, with only small stress on the driving mechanism.

When the individual windows are aligned with the photocell, the driving spring does not exert any influence on the exposure-setting member, but instead the latter is securely locked in its proper, light-admitting position. This fact is of double importance, since the delay time between energizing the amplifier and rendering the locking device effective is no longer of any consequence. Second, the locking device is not required to halt the moving setting member, but only to secure the same in its rest position against further movement with the next control step of the Geneva drive. Such circumstance is favorable to an extended life of the locking device.

The Geneva drive shown in FIG. 2 may be constructed in the well-known manner. Its disc 17, supported on the spindle 16 and under the action of the spring 10, has two projections 17a constituted as circular segments. For locking the disc 4 in its different adjusted positions the projections 17a cooperate with arcuate peripherial portions 4b of the disc 4. To drive the disc 4, the disc 17 has driving pins 18 displaced 90 degrees with respect to the projections 17a. The pins 18 are received in slots 4c in the disc 4, such slots being coordinated with the diaphragm apertures 4a.

For cocking the spring 10 there is provided a cocking member 20 having a handle 20a and gear teeth 20b meshing with a gear 19 connected with the disc 17. The spring 10 is bolted in cocked position at the disc 4 by means of the latch 12, 12a and the notch 4d in the periphery of the disc.

The driving connection between the member 20 and the gear 19 could employ a one-way drive effective only during the cocking movement of the member 20, and such member may return to its starting position under spring action, as will be readily understood.

Another embodiment of the invention is illustrated in FIG. 4 wherein the light-controlling or limiting means for the photocell comprises an iris diaphragm 22. To change the illumination of the photocell in steps, a stepped control device may be provided between the iris diaphragm and the spring drive (which latter is not drawn but is to be cocked by the disc 23). Such stepped control device is also constituted as a Geneva drive, similar to that shown in FIG. 2. The disc 24 in FIG. 4 corresponds to disc 17 in FIG. 2. Segment-shaped projections 24a of the disc 24, and pins 25 cooperate with arcuate peripheral portions 26a and slots 26b at the circumference of the ring 26 which drives the iris diaphragm. With the organization using the iris diaphragm as shown in FIG. 4 compact arrangement of the light-limiting control for the photocell is made possible.

As mentioned above, the exposure-setting member 23 may be bolted in its different adjusted positions by a lock controlled by an electro-responsive motive means, and such lock may be optionally provided as a notched device effective in one direction, or as a friction device.

In the embodiment of the invention shown in FIGS. 1 and 2 a locking device for the exposure-setting members 3 and 4 is provided as a notched device. For this purpose, the ring piece 27 connected to the member 3 is provided with notches 27a cooperating with a locking lever held under spring action, and such locking lever may be brought into locking position by an electro-responsive motive means such as a solenoid 28.

Such organization provides the advantages of simplicity and low cost, together with reliability and sturdiness. The sturdiness is especially important where moving parts are to be halted while in motion, as will be readily understood.

In FIG. 1 a two-armed lever 30 is provided, carried on a spindle 29 and urged counterclockwise by a spring 31. The lever 30 is held against a stop 62, as shown. The solenoid 28 has an armature received in a recess 30a of the lever, and a locking nose 30b is provided on the lever, to be received in the notches 27a of the member 27. To obtain a unidirectional locking effect, the nose 30b has a sloping surface 30c. Thus, the exposure-setting member 3 may be moved clockwise without interference from the lock for the purpose of cocking the spring 10.

In FIG. 2 a lever 32 is provided, functioning somewhat in the nature of a toggle, having two stable end positions in either of which it is held by a spring 33. In one of the end positions the lever 32 locks the exposure setting member 4, and in the other it frees the said member. The spring 33 acts through a dead-center position, to hold the lever either one way or the other. For cooperating with the notches 27, the lever 32 has a tapered nose 32a providing a uni-directional locking action, as with the embodiment shown in FIG. 1.

By providing the locking lever 32 so as to have a toggle action, it is necessary only to actuate said lever by the solenoid to an extent necessary to move it past the dead-center position. Thus, the solenoid may be de-energized upon this occurring, to limit the energy consumption to a minimum. Further, the solenoid 28 in FIG. 2 may be of small size and power, because only the light spring 33 need be overcome.

The solenoid 28 may thus be switched off in a simple and effective manner when the lever 32 is shifted counterclockwise to its locking position. For this purpose a switch 34 is provided, inserted in the control circuit for the solenoid 28, such switch being normally biased closed. To open the circuit, the arm 32b of the lever 32 actuates the switch 34 after the lever has been shifted counter-clockwise past its dead center position.

The solenoid 28 may also be deenergized independently of the locking device, by opening a switch which is closed upon the exposure setting member 4 being initially released, such circuit being opened when the release is inactivated.

Additional exposure factors, for example film sensitivity, which are not controlled by the exposure-setting member, may be taken into consideration with the exposure setting device of the present invention, through the medium of a simple structure enabling adjustable positioning between the exposure-setting member and the diaphragm-setting device. This may be effected, in the organization illustrated in FIG. 3, where the connection between the spindle 7 and the gear 130 may be of the releasable and adjustable type. A coupling disc 35 may be provided, fixed to the spindle 7 and releasably connected with the gear 130, and such connection may be by friction, or with notched parts. For setting the adjustment of the parts 35 and 130, the part 35 may have a film-sensitivity scale 36 while the part 130 may have an index mark 37.

Instead of the film-sensitivity scale 36, a filter factor scale could be arranged, or such latter scale could be provided in addition to the scale 36 at an additional member relatively adjustable with respect to the parts 130 and 35.

As already stated, for locking the exposure setting member, in the embodiment of the invention illustrated herein, a special locking device is arranged, which is brought into locking position by the electro-responsive motive means, as the solenoid 28.

To eliminate the necessity of a special locking device, the solenoid 28 could constitute in itself the lock. This could be effected by making the solenoid or electro-responsive motive means in the form of a miniature magnetic coupling to be controlled by the amplifier 2, one half of the coupling being coordinated with the exposure setting member to effect a drive between the latter and the spring drive therefor, deenergization of such magnetic coupling rendering inoperative such drive and making operative a brake for arresting or halting the exposure-setting member.

Such a miniature magnetic coupling could be so constructed that the clutch half is carried by a spindle and is axially movable under spring action to engage a second half connected with the drive member, thus rendering operable the drive between the setting member and the drive member. The electro-magnetic operation of the clutch half would shift it against the spring action thereof, holding said clutch half away from the other half and causing the exposure-setting member to be braked and locked against further movement.

One type of magnetic clutch as mentioned above, is illustrated in FIG. 7. In this figure, the clutch half mentioned is indicated at 40, said clutch half having an annular groove 41 in which there is received the arm 30x of a lever 30y, said lever being biased in a counter-clockwise direction by a spring 42. The lever 30y has another arm provided with a recess 30c, in which the plunger or armature of the solenoid 28 is received, by which the lever 30y may be shifted clockwise against the action of the spring 42. The clutch half 40, carried by the spindle 43 has circular rows of teeth on both of its opposite faces, one row of teeth being arranged to mesh with a driving wheel 44 carried by a shaft 45 which is powered by a spiral coil spring 10t. The spring 42 normally maintains the clutch half in engagement with the driving wheel 44 which latter is powered by the spiral spring 10t.

The clutch half 40 and spindle 43 are shiftable axially from right to left in bearings (not shown) from the position illustrated in FIG. 7 so as to disengage the teeth of the clutch half 40 from the teeth of the driving wheel 44. Such shifting movement from right to left is accomplished in response to energization of the solenoid 28, as effected initially by the photoelectric cell 1. The shaft 43 has a gear wheel 11t, which meshes with the cover member 3 for all shifted positions of the shaft 43 and clutch half 40. That is, the cover member 3 is drivingly connected to the clutch half 40 both when the latter is engaged with the driving wheel 44 and when the clutch half is disengaged from such wheel by energization of the solenoid 28. When the solenoid 28 is energized, shifting the clutch half 40 from right to left, the teeth on the opposite face of the clutch half will be brought into engagement with cooperable teeth of a brake or locking member 47, which is stationary and which therefore halts the clutch half 40, shaft 43, gear 11t, and cover member 3 in a particular adjusted position, preventing any further turning or rotation of the clutch. Accordingly, it will be seen that with the solenoid 28 deenergized, power applied by the spiral coil spring 10t may effect a rotary shifting of the cover member 3, and upon the solenoid 28 being energized by sufficient light striking the photoelectric cell 1, the driving power will be disconnected from the cover member 3, and instead the latter will be rapidly positively braked and halted, by engagement of the clutch half 40 with the braking member 47. While the parts 40, 44 and 47 are shown as having large, widely spaced teeth, this is for convenience of illustration only, as actually a large number of very fine teeth would ordinarily be used.

Operation of the device of the present invention is essentially as follows: The drive spring 10 is first cocked. Thereupon, release of the latch or bolt which holds the spring cocked will enable a running down movement of the spring to be obtained, actuating the exposure-setting member and the coupled photocell cover member in a direction to effect a progressive movement of windows from the smallest to the largest, in front of the photocell. In the embodiment of the invention shown in FIGS. 1 and 3 the movement of the exposure setting member and cover member are continuous, whereas in the embodiment shown in FIGS. 2 and 4 the movements of the cover member are stepped.

The movement of the cover member brings the windows or apertures thereof in coincidence with the photocell, one after another, thus resulting in progressively stepped increments of light on said cell.

As soon as a sufficient illumination of the cell is effected, the solenoid 28 will be energized, activating the locking device and bolting the exposure-setting member.

As already mentioned, in FIGS. 1 and 2 the locking device is of the notched type, cooperable with a locking lever. When the exposure-setting member is locked, the proper exposure conditions are effected to provide a basis for the taking of the picture.

After the picture has been taken, the exposure setting member (and the diaphragm setting device) are returned to the positions where the smallest window is adjacent the photocell. This cocks the spring 10, and the latch 12, 12a is made operative to hold the spring 10 cocked. The device is now ready for a new exposure.

Where a film of different sensitivity is to be used, the new sensitivity value is adjusted by relative displacement between the exposure-setting member and the diaphragm or cover member. In FIG. 3 the exposure setting member 9 is held stationary and the knob 14 is turned, to bring the desired film sensitivity value of the scale 36 opposite to the index mark 37.

Variations and modifications may be made within the scope of the claims, and portions of the improvements may be used without others.

I claim:
1. In a photographic camera, exposure-adjusting means including a movable setting member having a number of different predetermined positions; a releasable lock for locking said member in a finite number of fixedly-related different positions; an electro-magnetic-mechanical control device for actuating said lock; photoelectric means including a photocell having a light-sensitive surface adapted to be exposed to light from a subject; an electronic amplifier connected to the photocell for control thereby, said amplifier being connected to said control device and having an output capable of fully energizing said device to effect complete actuation of said lock, said amplifier being responsive to photocell voltage when the latter changes and attains a predetermined value and being arranged to have a switching-type on-off action by which the said predetermined value switches it on and operates the control device; and a stepping-type light-limiting means movable in response to movement of said setting member, for causing a number of different, consecutive and distinctly separate values of light energy to reach said light-sensitive surface of the photocell respectively as the setting member is moved through the said predetermined positions whereby the member may be halted in a given position by the said lock in response to a predetermined triggering intensity of light from the subject, causing a response of said amplifier.

2. The invention as defined in claim 1, in which the light-limiting means comprises a member movable in front of the said light-sensitive surface, said member having a plurality of diaphragm apertures of different sizes, adapted to be disposed one after the other in front of the said surface.

3. The invention as defined in claim 1, in which the light-limiting means comprises a member movable in front of the said light sensitive surface, said member having a plurality of openings adapted to be disposed one after another in front of said surface, and having windows of different degrees of opacity, disposed in said apertures.

4. The invention as defined in claim 1, in which the light-limiting means includes a member movable in front of the light sensitive surface of the photocell, said member having apertures of different sizes intended to be disposed one after another in front of the said surface, said apertures having windows characterized by different degrees of opacity.

5. The invention as defined in claim 1, in which the light-limiting means comprises a member constituted as a slide, said member being movable in front of the light-sensitive surface of the photocell and having a plurality of apertures adapted to be disposed one after another in front of said surface.

6. The invention as defined in claim 1, in which the light-limiting means comprises an elongate strip of sheet material having openings adapted to be disposed one after another in front of the light-sensitive surface of the photocell.

7. The invention as defined in claim 1, in which there is a spring drive adapted to be cocked, for driving the movable setting member and the said light-limiting means.

8. The invention as defined in claim 7, in which the light-limiting means comprises a member movable in front of the light-sensitive surface of the photocell, said member having a plurality of portions adapted to be disposed one after another in front of said surface and admitting different quantities of light in a graduated sequence, the cocked positions of the spring drive, setting member and light-limiting means being such that the amount of light admitted to the light-sensitive surface increases during the running-down movement of said spring drive, setting member and light-limiting means.

9. The invention as defined in claim 7, in which the spring drive includes a step-type transmission to effect periodic halting of the setting member and light-limiting means during the running-down movement of the spring drive.

10. The invention as defined in claim 1, in which the light-limiting means comprise a diaphragm adapted to present different openings in front of the light-sensitive surface, in which there is a spring drive adapted to be cocked and to actuate the setting member, and in which there is a stepped-drive mechanism between said spring drive and diaphragm, to cause stepped movements of the latter as the spring drive runs down.

11. The invention as defined in claim 1 in which the releasable lock comprises a uni-directional acting pawl.

12. The invention as defined in claim 11, in which the lock includes a notched member carried by the setting member and a spring-charged locking lever engageable with said notched member, said spring-charged lever normally opposing the energizing movement of the said motive means.

13. The invention as defined in claim 11, in which the releasable lock includes a notched member carried by the setting member and a lever having a projection engageable with said notched member, and in which there is a spring means connected with said lever for moving the same in either of two directions engaging and locking said member, or disengaging the member.

14. The invention as defined in claim 13, in which the electro-responsive motive means includes a control circuit having a circuit-opening switch therein, and in which the lever when moving to its locking position actuates the said switch to open the control circuit.

15. The invention as defined in claim 14, in which the said switch automatically closes the control circuit when the said lever is disengaged from the notched member and shifted in the opposite direction past its dead-center position.

16. The invention as defined in claim 1, in which there is a coupling means between the setting member and light-limiting means, enabling the same to have different relative positions, thereby to adjust for other conditions of exposure.

17. In a photographic camera, exposure-adjusting means including a movable setting member having a number of different predetermined positions; photoelectric means including a photocell having a light-sensitive surface adapted to be exposed to light from a subject; movable light-limiting means for enabling a plurality of different values of light energy to reach said light-sensitive surface of the photocell; a spring drive; an electromagnetic coupling between the spring drive and setting member, energized by said photoelectric means, for effecting a drive between the spring drive and setting members; and a lock actuated by the magnetic coupling when it is deenergized, for locking the setting member in its newly adjusted position.

References Cited in the file of this patent

UNITED STATES PATENTS

| | | |
|---|---|---|
| 2,058,562 | Bucky et al. | Oct. 27, 1936 |
| 2,226,602 | Frost | Dec. 31, 1940 |
| 2,278,338 | Tonnies | Mar. 31, 1942 |
| 2,380,216 | Carter | July 10, 1945 |
| 2,388,609 | Ericsson | Nov. 6, 1945 |
| 2,521,093 | Rath | Sept. 5, 1950 |
| 2,655,848 | Gray | Oct. 20, 1953 |
| 2,811,081 | Praeger | Oct. 29, 1957 |